May 23, 1961 P. C. BOWSER 2,985,445
PNEUMATIC SPRING CONTROL DEVICE
Filed June 20, 1957 3 Sheets-Sheet 1

INVENTOR.
Phillip C. Bowser
BY
W. S. Pettigrew
ATTORNEY

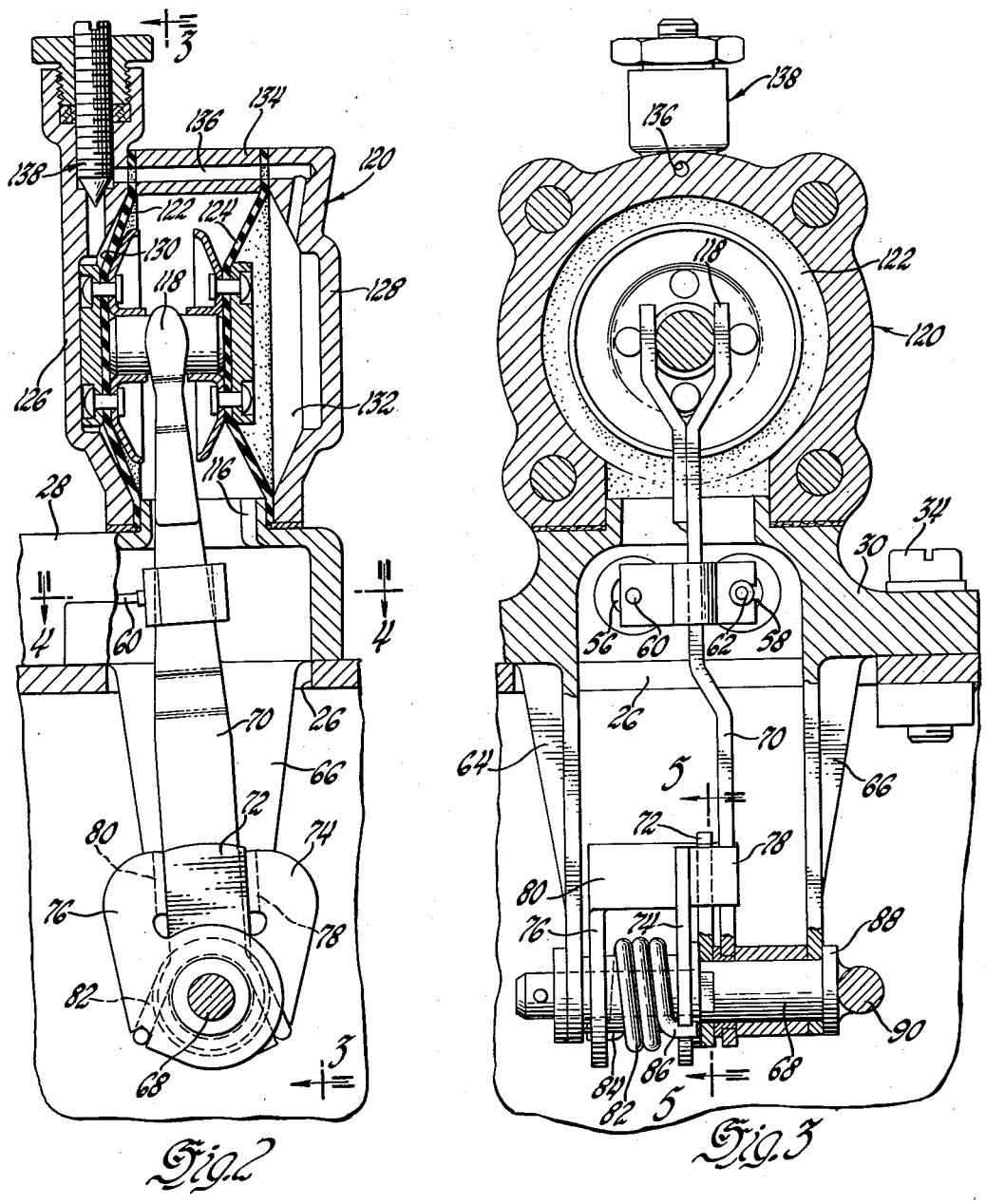

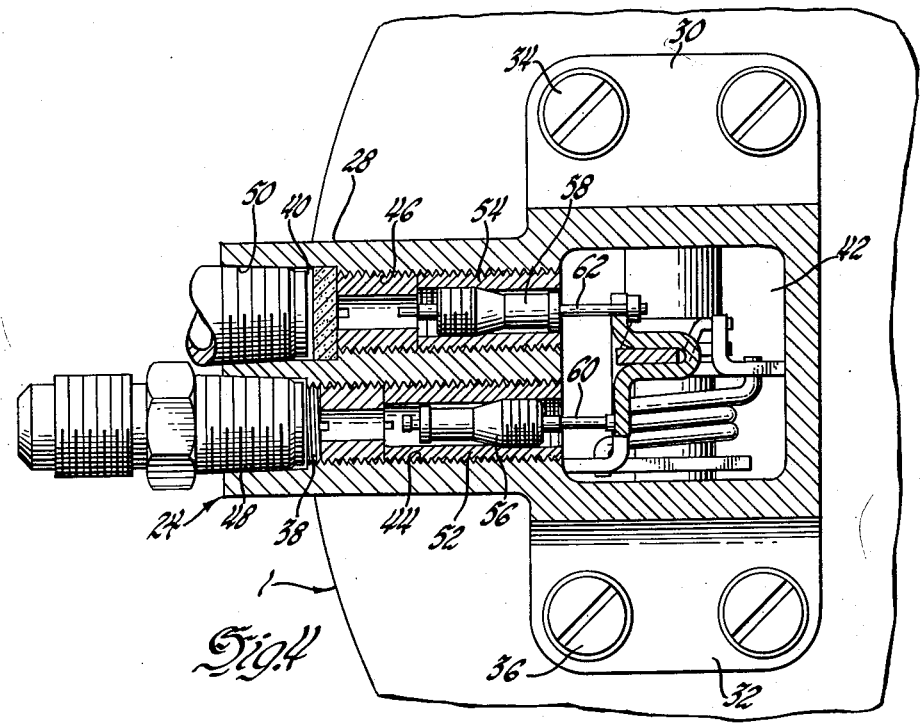

United States Patent Office 2,985,445
Patented May 23, 1961

2,985,445

PNUEMATIC SPRING CONTROL DEVICE

Phillip C. Bowser, St. Clair Shores, Mich., assignor to General Motors Corporation, Detroit, Mich., a corporation of Delaware Filed June 20, 1957, Ser. No. 666,811

1 Claim. (Cl. 267—65)

This invention relates to pneumatic springs and control mechanism therefor.

An object of the present invention is to provide an improved air spring construction.

Another object is to provide an improved air spring construction and leveling device therefor adapted to control intake and exhaust of air responsive to variation in displacement between the sprung and unsprung portion of a vehicle with which the spring is associated.

Still another object is to provide an air spring of the type including at least one inflexible air confining body, wherein the latter has attached thereto a leveling valve mechanism, the operation of which is controlled by a mechanism disposed interiorly of the air confining body.

Another object is to provide a leveling valve mechanism for an air spring wherein the valve mechanism is located externally of the spring and the actuating mechanism therefor is located entirely internally of the spring.

Still a further object is to provide a device of the stated character including damping mechanism adapted to retard the action of the leveling valve so as to prevent response thereof to high frequency low amplitude oscillation of the springs.

Yet a further object is to provide a leveling valve and air spring assembly of the stated character including externally accessible means for correlating the operating range of the leveling valve mechanism in relation to the desired displacement between the sprung and unsprung portion of the vehicle.

These and other objects, advantages and features of the invention will become more fully apparent as reference is had to the accompanying specification and drawings wherein:

Fig. 2 is an enlarged fragmentary view, partly in section, and with parts broken away illustrating a portion of the leveling valve assembly;

Fig. 3 is an enlarged fragmentary view, partly in section, looking in the direction of arrows 3—3 of Fig. 2;

Fig. 4 is an enlarged fragmentary view, partly in section, looking in the direction of arrows 4—4 of Fig. 2;

Fig. 5 is a fragmentary view looking in the direction of arrows 5—5 of Fig. 3; and Fig. 6 is an enlarged fragmentary view, partly in section, looking in the direction of arrows 6—6 of Fig. 1.

Figure 1:
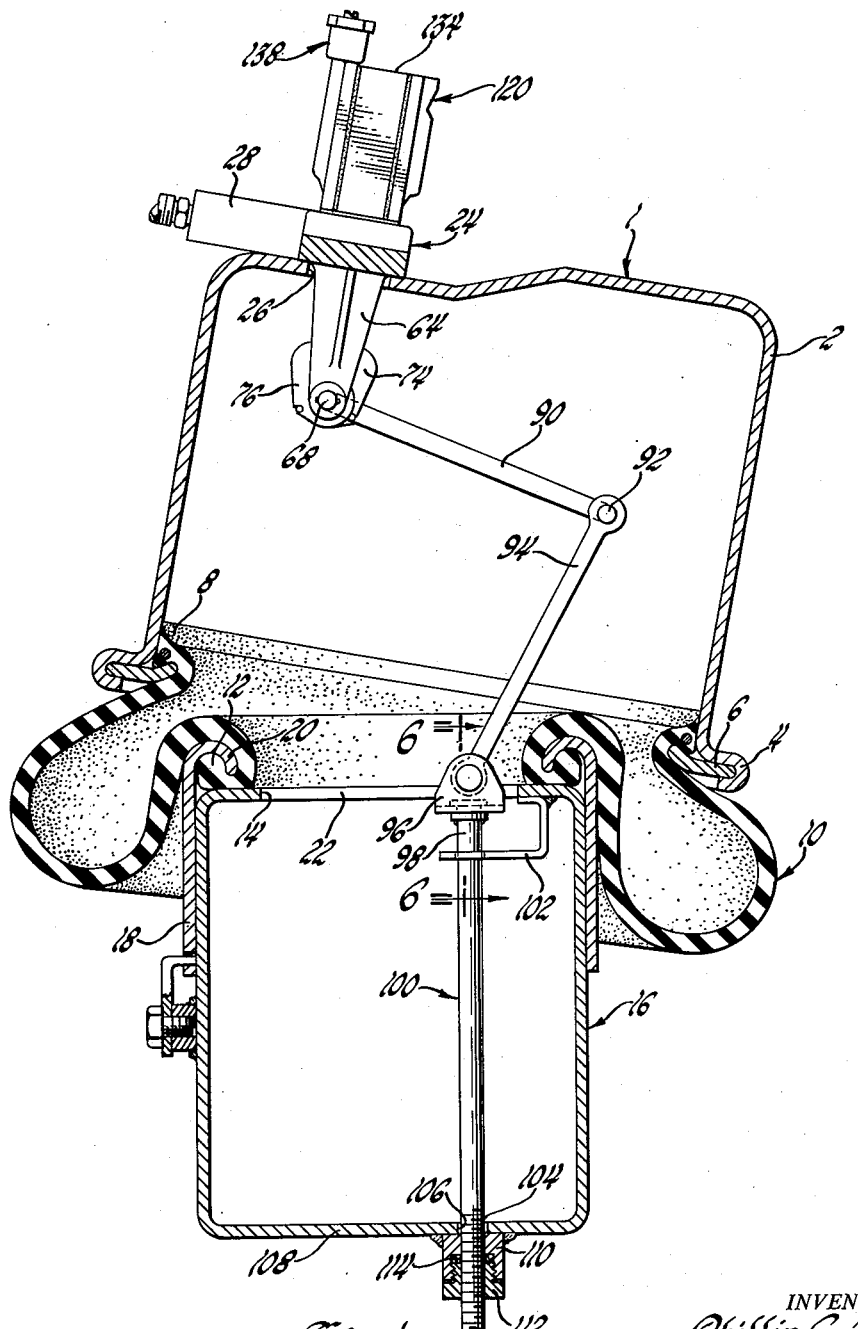
Fig. 1 is an elevational view, partly in section, illustraing an air spring construction and associated leveling valve and operating mechanism embodying the present invention.

Referring now to the drawings and particularly Fig. 1, there is illustrated an air spring assembly 1 wherein the reference numeral 2 indicates generally a dome-shaped sheet metal body having a flanged peripheral lip 4 at the open bottom thereof. Dome 2 is adapted for mounting in a suitable location on the sprung portion of a vehicle, not shown. Carried in flange 4 of dome 2 is a circular bellows retainer ring 6, the upturned inner periphery of which provides a seat for the beaded outer periphery 8 of a bellows assembly 10. In operation, periphery 8 of bellows 10 is maintained in sealing engagement with the juncture of dome 2 and retainer ring 6 by internal air pressure in the spring assembly. At its inner periphery, bellows 10 is formed with a retroflexed portion having an upwardly facing circular bead 12 which is clamped to the top wall 14 of a spring piston 16 by means of a telescoping sleeve 18 having a curled upper annular lip 20. Piston 16 is intended to be rigidly mounted to a vehicle wheel supporting arm, not shown, and to reciprocate therewith in an arcuate path in and out of dome 2. It will be noted that the upper end of piston 16 is provided with a relatively large central opening 22 communicating with the interior of dome 2 so that the air capacity of the spring assembly includes the entire internal volume of the piston 16.

In accordance with one feature of the invention, a leveling valve assembly 24 is attached to the outer surface of the upper wall of dome 2 over an opening 26, and is controlled by linkage disposed internally within the spring assembly. Assembly 24 is constructed and arranged in a manner shortly to be described so as to control introduction and emission of air to and from the interior of the spring so as to maintain a predetermined vertical clearance between dome 2 and piston 16 regardless of variation in load imposed on the spring assembly.

As seen best in Fig. 4, leveling valve assembly 24 includes a generally horizontal portion 28 having ear portions 30 and 32 through which attaching screws 34 and 36 extend. Formed in portion 28 are a pair of parallel intake and exhaust passages 38 and 40, respectively, which communicate with a generally rectangular depending passage 42 communicating with the interior of the spring assembly. Intake and exhaust passages 38 and 40 are provided with internal screw threads 44 and 46 throughout the major portion of their length, and with pipe threads 48 and 50 at the outer terminal ends thereof. Screw threads 44 and 46 are adapted to receive threaded bushings 52 and 54 which, in turn, are threadably secured therein with a pair of oppositely disposed Schrader valve assemblies 56 and 58. Assemblies 56 and 58 are arranged in reverse directions so that intake passage 38 is opened to communication with the interior of the spring when pressure is exerted toward the left on the operating stem 60, while exhaust passage 40 is opened to communication with the interior of the spring when pressure is exerted on the operating stem 62 toward the right. Each of the pipe threads 48 and 50 provide for connection with air intake and exhaust lines, not shown, forming part of an air supply and control system, also not shown.

In order to correlate the operation of valves 56 and 58 in accordance with the relative displacement of piston 16 and dome 2, assembly 24 is provided with a pair of integral parallel depending legs 64 and 66 which extend through opening 26 into the interior of dome 2. Rotatably supported on the lower ends of legs 64 and 66 is a pivot shaft 68 which, in turn, has journalled thereon an upwardly extending valve operating lever 70. Axially adjacent lever 70, pivot shaft 68 has keyed thereto an upstanding finger 72. Axially adjacent finger 72, shaft 68 has rotatably journalled thereon a pair of axially spaced members 74 and 76, the upper ends of which are provided with short and long wing portions 78 and 80, respectively, which overlap the opposite side edges of both lever 70 and finger 72. Surrounding pivot shaft 68 between members 74 and 76 is a coiled torsion spring 82 having bent end portions 84 and 86 which are keyed to members 74 and 76 so that the torsional loading of the spring urges wing portions 78 and 80 into resilient engagement with the side edges of lever 70 and finger 72. Rigidly attached at one end 88 of pivot 68 is a generally horizontally extending arm 90, the opposite end of which is pivotally connected at 92 to a link 94. The opposite end of link 94, in turn, is pivotally connected to a clevis structure 96 which is swivel mounted on the upper end 98 of a vertically extending rod 100 supported in piston 16.

As seen best in Fig. 1, rod 100 extends through a bracket 102 fastened to the upper wall 14 of piston 16, while the lower threaded end 104 thereof extends through an opening 106 in the bottom wall 108 of the piston. Welded on bottom wall 108 over opening 106 in flush relation with wall 108 is an annular boss 110 which is provided with a counterbored internally threaded portion adapted to receive a rod adjustment nut 112. To initially adjust the operating range of leveling valve assembly 24 to correspond with the desired design height vertical displacement between dome 2 and piston 16, nut 112 is loosened slightly in boss 110 to permit rotation of rod 100. Subsequent rotation of the rod in either direction causes raising or lowering of clevis 96 resulting in either decrease or increase in the angle defined by arm 90 and link 94. An incidence of change in this angle, operating lever 70 changes position relative to valves 56 and 58, hence either greater or lesser displacement between dome 2 and piston 16 is required to reorient lever 70 to a position in which neither leveling valve 56 or 58 is actuated. When the desired design height has been achieved, nut 112 is tightened in boss 110 compressing the flexible washer 114 and thereby positively preventing leakage therethrough as well as locking rod 100 against further rotation.

In order to prevent actuation of valves 56 and 58 in response to high frequency low amplitude spring oscillation, and thus prevent overcontrol and excessive air consumption, leveling valve assembly 24 includes a fluid damper device which is effective to prevent instantaneous angular movement of lever 70 responsive to momentary angular changes of arm 90. As seen best in Figs. 2 and 3, portion 28 of valve assembly 24 is formed with an upturned pilot flange 116 through which the upper end 118 of lever 70 extends. Surrounding flange 116 is a dashpot housing 120. Housing 120 is provided with a pair of spaced apart circular diaphragms 122 and 124 arranged respectively at opposite sides of lever end portion 118. Each diaphragm cooperates with the adjacent housing wall 126 and 128, respectively, to form a pair of closed cavities 130 and 132 in which is contained a suitable non-compressible fluid. Extending transversely across the top wall 134 of housing 120, is a passage 136 providing communication between the respective cavities. Rate of fluid transfer from one cavity to the other responsive to pressure exerted by lever 70 is controlled by a manually adjustable needle valve assembly 138. (In the drawing, the lever 70 and diaphragms are shown at the extreme limit of movement in a direction causing actuation of intake valve 56.) In operation, rapid angular movement of lever 70 from its normal centered position is initially resisted by the damper device. However, rapid angular movement of arm 90 is accommodated by torsional yielding of spring 82. The operation of spring 82 will be evident by reference to Fig. 2 wherein it will be seen that angular movement of finger 72, for example in a clockwise direction, will impart similar angular movement to member 74, while member 76 will remain stationary against the side edge of lever 70. Thus, whenever the resistance of the damper exceeds the torsional limits of spring 82, the difference in rate of angular movement of arm 90 and lever 70 will be taken up in lost motion by spring 82. However, as soon as the dashpot delay period has elapsed, spring 82 urges lever 70, finger 72 and members 74 and 76 back to the normal relationship shown in Fig. 2, thus reestablishing the original angular relationship of lever 70 and arm 90. It will thus be apparent that either relatively slow change in angular position of arm 90 or a prolonged change in such angular position will cause operation of the leveling valve mechanism in accordance with the spring displacement variation encountered.

While but one embodiment of the invention has been shown and described, it will be evident that other changes and modifications may be made therein. It is, therefore, to be understood that it is not intended to limit the invention to the embodiment shown, but only by the scope of the claim which follows.

I claim:

In a fluid spring of the type having two relatively movable members adapted to exert compressing force on said fluid, valve means mounted on one of said members so as to be detachable externally and adapted to control flow of fluid in and out of said spring, a valve operating lever pivotally mounted on one of said members internally of said spring and having its free end operatively engaging said valve means, a scissors linkage operatively connected between the pivoted end of said lever and the other of said members, and double acting torsional drive means between one end of said scissors linkage and said lever permitting angular movement of the linkage in either direction beyond the mechanical limits of travel of said lever, the connection between one end of said scissors and the other of said members including an externally accessible adjustment mechanism for varying the initial angular relationship of the scissors arms, said adjustment mechanism comprising a rotatable rod having an elongated threaded end portion extending through an aperture in said other member, an internally threaded pilot portion on said member surrounding the threaded portion of said rod, a lock nut threadably engaging both said pilot portion and said rod, and a washer surrounding said rod and disposed between said pilot portion and said nut, said washer being compressible by said nut to simultaneously prevent rotation of said rod and leakage of fluid from said spring.

References Cited in the file of this patent

UNITED STATES PATENTS

| | | |
|---|---|---|
| 1,544,850 | Messier | July 7, 1925 |
| 2,147,990 | Richter | Feb. 21, 1939 |
| 2,271,823 | Hundertmark | Feb. 3, 1942 |
| 2,361,575 | Thompson | Oct. 31, 1944 |
| 2,607,611 | Allison | Aug. 19, 1952 |
| 2,670,201 | Rossman | Feb. 23, 1954 |
| 2,844,386 | Pribonic | July 22, 1958 |
| 2,874,957 | Davis | Feb. 24, 1959 |
| 2,888,273 | Jackson | May 26, 1959 |